(12) United States Patent
Newman et al.

(10) Patent No.: US 11,237,603 B2
(45) Date of Patent: Feb. 1, 2022

(54) SECONDARY BACK SURFACE TOUCH SENSOR FOR HANDHELD DEVICES

(71) Applicant: TEXAS INSTRUMENTS INCORPORATED, Dallas, TX (US)

(72) Inventors: Merril Ray Newman, Schaumberg, IL (US); Yiding Luo, Frisco, TX (US); David Brian Smith, Rowlett, TX (US); Michael Richard Dille, Bartlett, IL (US); Matthew Alan Beardsworth, Austin, TX (US); Alan R. Manlick, Murphy, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/011,173

(22) Filed: Sep. 3, 2020

(65) Prior Publication Data

US 2021/0055766 A1 Feb. 25, 2021

Related U.S. Application Data

(63) Continuation of application No. 16/161,832, filed on Oct. 16, 2018, now Pat. No. 10,775,853.

(51) Int. Cl.
*G06F 1/16* (2006.01)
*G06F 3/044* (2006.01)
*G06F 3/041* (2006.01)

(52) U.S. Cl.
CPC .......... *G06F 1/1692* (2013.01); *G06F 1/1626* (2013.01); *G06F 3/044* (2013.01); *G06F 3/0418* (2013.01)

(58) Field of Classification Search
CPC ...... G06F 1/1626; G06F 1/1633; G06F 1/165; G06F 1/1647; G06F 1/1671; G06F 1/1692; G06F 1/1694
See application file for complete search history.

(56) References Cited

U.S. PATENT DOCUMENTS

| | | | |
|---|---|---|---|
| 8,395,587 B2 | 3/2013 | Cauwels et al. | |
| 9,035,903 B2 | 5/2015 | Binstead | |
| 9,778,803 B2 * | 10/2017 | Sato | G06F 1/1643 |
| 10,775,853 B2 * | 9/2020 | Newman | G06F 1/1626 |
| 2007/0184781 A1 | 8/2007 | Huskinson | |

(Continued)

FOREIGN PATENT DOCUMENTS

| | | |
|---|---|---|
| JP | 2009134451 | 6/2009 |
| WO | WO03052944 A2 | 6/2003 |

OTHER PUBLICATIONS

Texas Instruments. "MSP430FR263x, MSP430FR253x Capacitive Touch Sensing Mixed-Signal Microcontrollers." SLAS942B—Nov. 2015—Revised Jun. 2017.

(Continued)

*Primary Examiner* — Anthony Q Edwards
(74) *Attorney, Agent, or Firm* — Brian D. Graham; Charles A. Brill; Frank D. Cimino

(57) ABSTRACT

A second touch area provided on the back side of the mobile phone in a location such that an index finger can be used to provide input when while the mobile phone is being held in that one hand. A second hand is not required for the various types of input that are provided using this second touch area. This allows the mobile phone to be used in single-handed operation in many circumstances.

20 Claims, 9 Drawing Sheets

(56) References Cited

U.S. PATENT DOCUMENTS

| | | |
|---|---|---|
| 2011/0291946 A1 | 12/2011 | Mann et al. |
| 2012/0182217 A1 | 7/2012 | Miroshnichenko |
| 2013/0093728 A1 | 4/2013 | Oh et al. |
| 2013/0187882 A1 | 7/2013 | Kim |
| 2013/0215060 A1* | 8/2013 | Nakamura ............ G06F 1/1643 |
| | | 345/173 |
| 2013/0300668 A1* | 11/2013 | Churikov ................ G06F 3/041 |
| | | 345/168 |
| 2013/0300697 A1* | 11/2013 | Kim ...................... G06F 3/0488 |
| | | 345/173 |
| 2015/0103018 A1 | 4/2015 | Kamin-Lyndgaard et al. |
| 2016/0026304 A1 | 1/2016 | Wu et al. |
| 2017/0032169 A1 | 2/2017 | Pi et al. |
| 2017/0102810 A1* | 4/2017 | Satake ..................... G06F 1/169 |
| 2019/0027111 A1 | 1/2019 | Wilde et al. |
| 2020/0117246 A1* | 4/2020 | Newman ............... G06F 3/0418 |

OTHER PUBLICATIONS

Texas Instruments. "TI Designs Noise-Tolerant Capacitive-Touch Human-Machine Interfaces Design Guide." TIDUBK4—Jun. 2016. pp. 1-107.

Texas Instruments. "TI Designs Touch Remote Control with CapTIvate (tm) Technology." TIDUBT7A—Jul. 2016—Revised Dec. 2016. pp. 1-26.

Ling Zhu. "Capacitive Touch Through Metal Using MSP430(tm) MCUs with CapTIvate(tm) Technology." Application Report SLA811A—Oct. 2017—Revised Nov. 2017. Texas Instruments, pp. 1-30.

International Search Report for Pct/US2019/056571 dated Jan. 23, 2020.

\* cited by examiner

SECONDARY BACK SURFACE TOUCH SENSOR FOR HANDHELD DEVICES

CROSS-REFERENCE TO RELATED APPLICATIONS

This application is a continuation of U.S. patent application Ser. No. 16/161,832, filed Oct. 16, 2018, which is incorporated by reference herein in its entirety.

BACKGROUND

1. Field

The field relates to input methods for handheld devices.

2. Description of the Related Art

Mobile phones have developed dramatically over the last few years. Many mobile phone have a large touchscreen front face. This large touchscreen allows very complicated and sophisticated input methods to be used, such as virtual keyboards, multiple finger touches and the like. However, another common trend among mobile phones has been to get ever larger. This makes it harder to hold the phone and it becomes extremely difficult to try and operate the phone one-handed. Therefore, to do operations on the mobile phone the user is required to use both hands, one to hold the phone and one to provide the input. This can be very cumbersome in many circumstances.

SUMMARY

A second touch area is provided on the back side of the mobile phone in a location such that an index finger can be used to provide input when while the mobile phone is being held in that one hand. A second hand is not required for the various types of input that are provided using this second touch area. This allows the mobile phone to be used in single-handed operation in many circumstances.

BRIEF DESCRIPTION OF THE FIGURES

For a detailed description of various examples, reference will now be made to the accompanying drawings in which.

DETAILED DESCRIPTION

Figure 1:
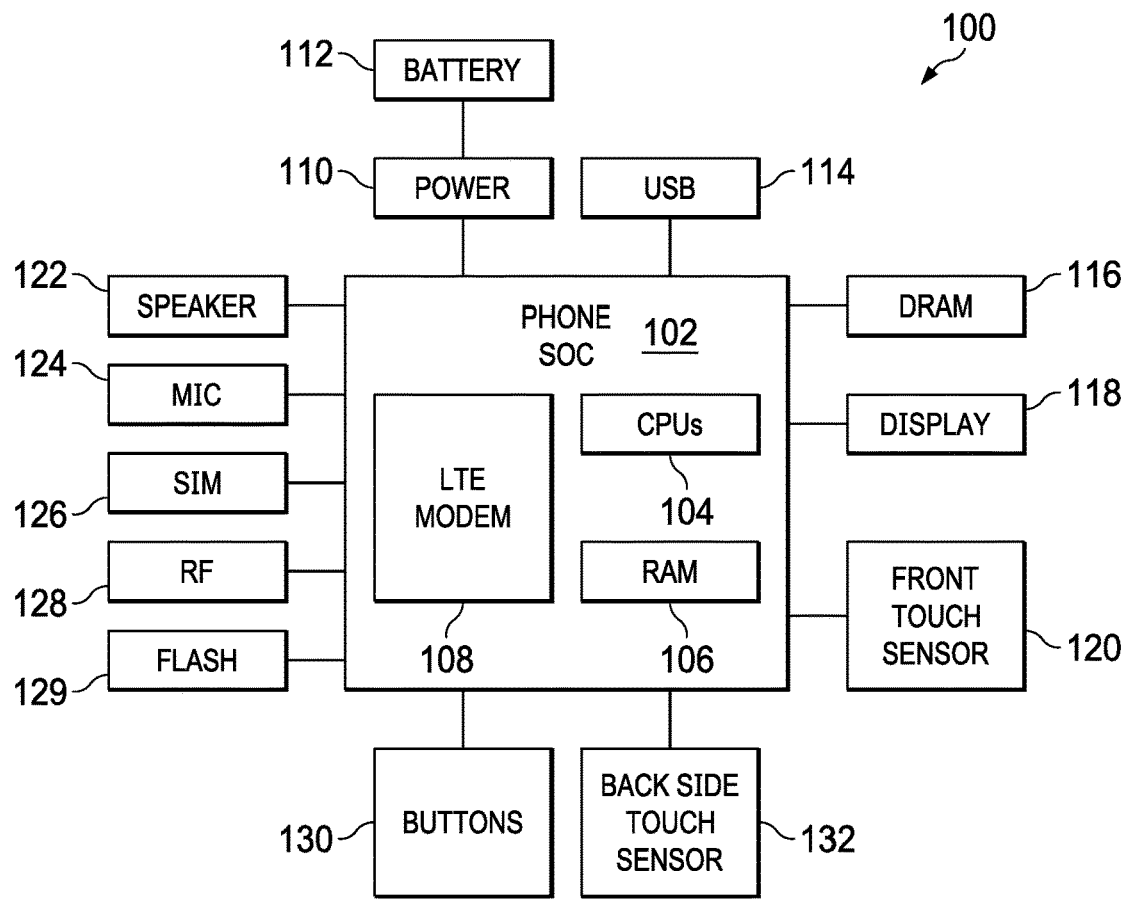
FIG. 1 is a block diagram of an example mobile phone.

Referring now to FIG. 1, a block diagram of an exemplary mobile phone 100 is illustrated. The mobile phone 100 may include a phone system on a chip (SOC) 102. The phone SOC 102 includes a plurality of processors 104, an amount of RAM 106 and an Long-Term Evolution (LTE) modem 108. It is understood that this is a very simple illustration of an exemplary phone SOC and many other variants are available with some of the components, such as the modem being offboard. A power subsystem 110 provides power to the phone SOC 102. A battery 112 provides electrical power to the power subsystem 110. A USB port 114 is provided for external wired communications with the phone SOC 102. A large amount of dynamic RAM (DRAM) 116 is provided to be the primary memory store, with internal RAM 106 operating more as operating memory for the various processors 104. A display 118 is connected to the phone SOC 102 to provide the primary front view of the mobile phone 100. A front touch sensor system 120 is connected to the phone SOC 102 and overlays the display 118, with a separate processor operating the touch sensor. A speaker 122 provides audio output for the mobile phone 100, while a microphone 124 provides audio input to the phone SOC 102. A subscriber identification module (SIM) 126 is connected to the phone SOC 102 to provide personalization information. The radio frequency (RF) section 128 is connected to the phone SOC 102 to perform the actual wireless transmissions used in mobile phones. A flash or non-volatile memory is connected to the phone SOC 102 to store programs executed by the processors 104. A series of buttons 130 are connected to the phone SOC 102 as necessary, such as, e.g., power buttons, volume buttons and the like. A back side touch sensor system 132 is connected to the phone SOC 102 to provide a back side touch system on the mobile phone 100.

Figure 2:
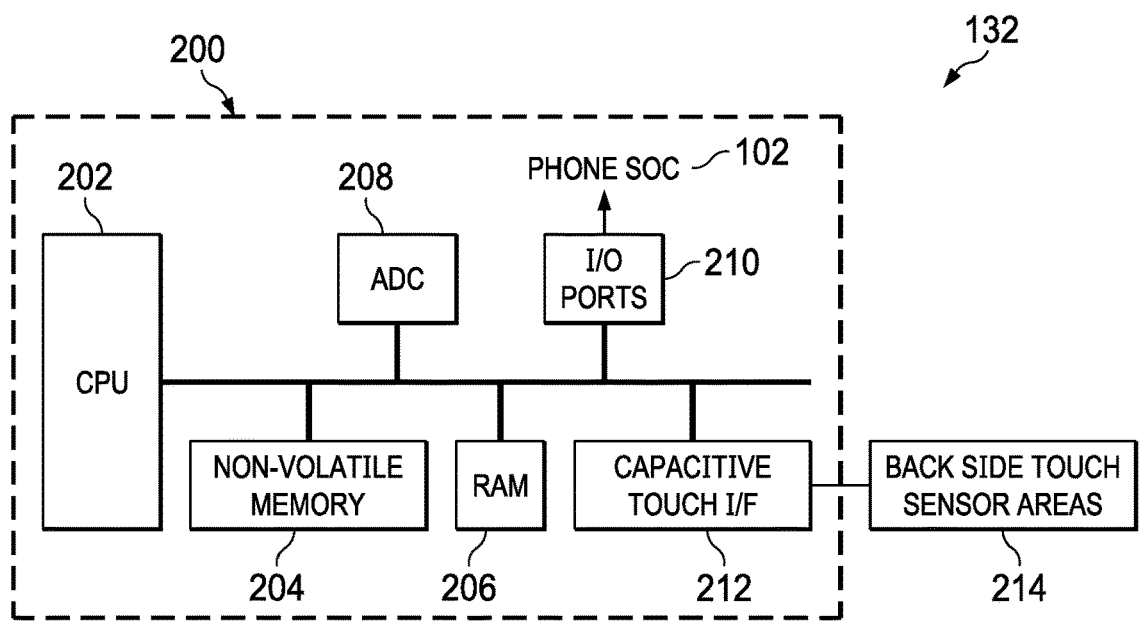
FIG. 2 is a block diagram of a capacitive touch system.

FIG. 2 is a block diagram of the back side touch sensor system 132. A touch sensor controller 200 is the computational portion of the back side touch sensor system 132. A processor or CPU 202 is provided in the touch sensor controller 200 to perform the necessary calculations. A nonvolatile memory 204, which stores the programs executed by the CPU 202, is connected to the CPU 202. RAM 206 is also connected to the CPU 202 to act as working memory. An analog-to-digital converter (ADC) section 208 is provided to allow analog operations of the back side touch sensor system 132. Input output (I/O) ports 210 are provided and connected to the CPU 202 to allow CPU 202 to interface with the phone SOC 102. Most relevant to this discussion, a capacitive touch interface 212 is connected to the CPU 202 to perform the analog operations used in capacitive touch sensing. A back side touch sensor area 214 is connected to the capacitive touch interface 212. In normal operation the touch sensor controller 200 provides the location of the user's index finger over or in relation to the back side touch sensor area 214 to the phone SoC 102, to allow control of the mobile phone 100. An MSP430FR2633 capacitive touch sensing mixed-signal microcontroller from Texas Instruments is an example of a back side touch sensor controller 200.

Figure 3:
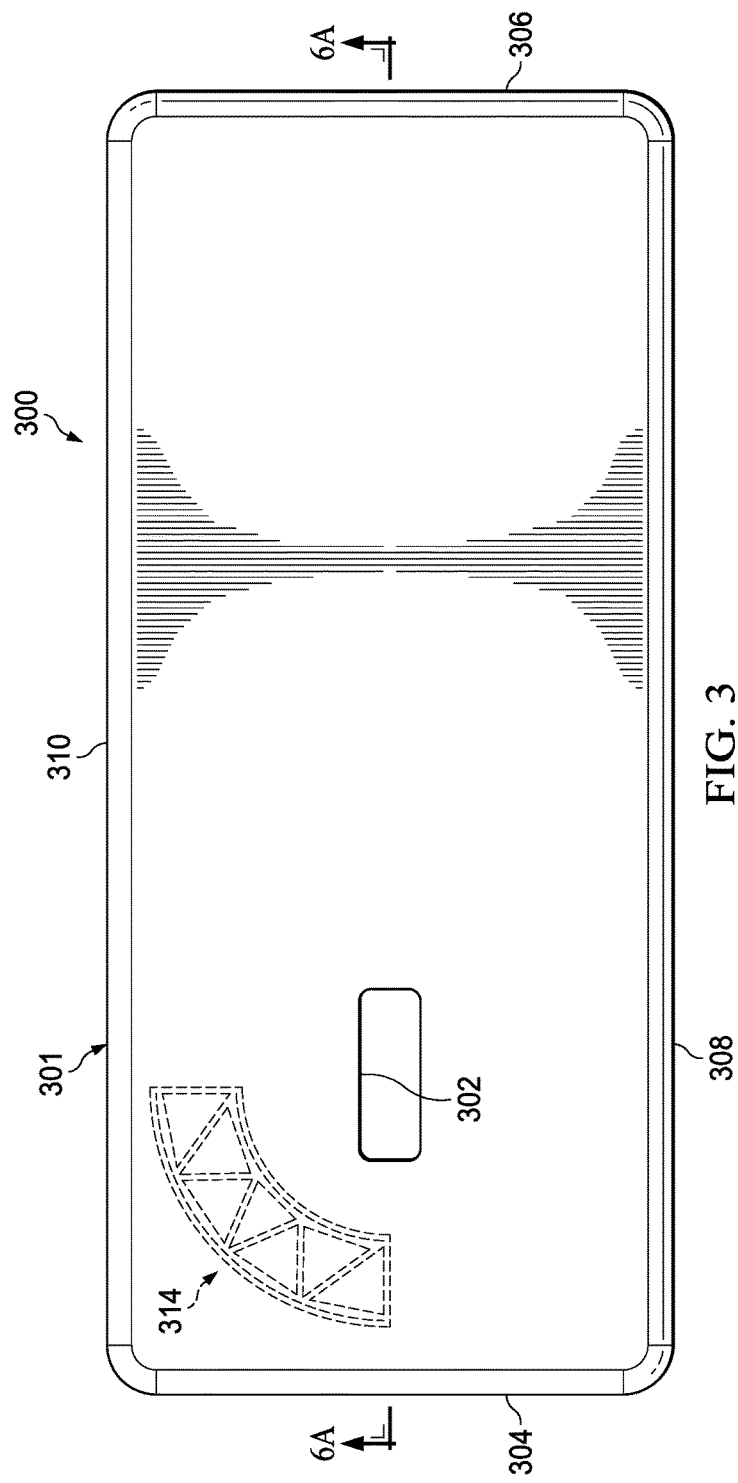
FIG. 3 is a back view of a mobile phone illustrating an example location of an example capacitive touch sensor.

Referring now to FIG. 3, a back view of exemplary mobile phone 300 is provided. The mobile phone 300 has a top 304, a bottom 306, a right side 308 (when viewed from the front) and a left side 310. An opening 302 is provided in a back cover or plate 301 to allow for a camera and related optical components. Other openings may be provided, such as for a power button or a fingerprint sensor. Shown in dashed lines is a back side touch sensor 314 of the mobile phone 300. The back side touch sensor 314 is shown in dotted lines and is located behind the back cover 301 of the mobile phone 300. As can be seen from a review of FIG. 3, if the mobile phone 300 is held in the right-hand of an individual with the top 304 of the mobile phone 300 in an upward direction, then the back side touch sensor 314 is located such that the index finger of the user can readily swipe over the back side touch sensor 314. The arcuate shape of the back side touch sensor 314 conforms to a path taken by the user's fingertip. This allows a secondary input which can be used by the user while the phone is held in a single hand and not requiring the use of a second hand.

Figure 4:
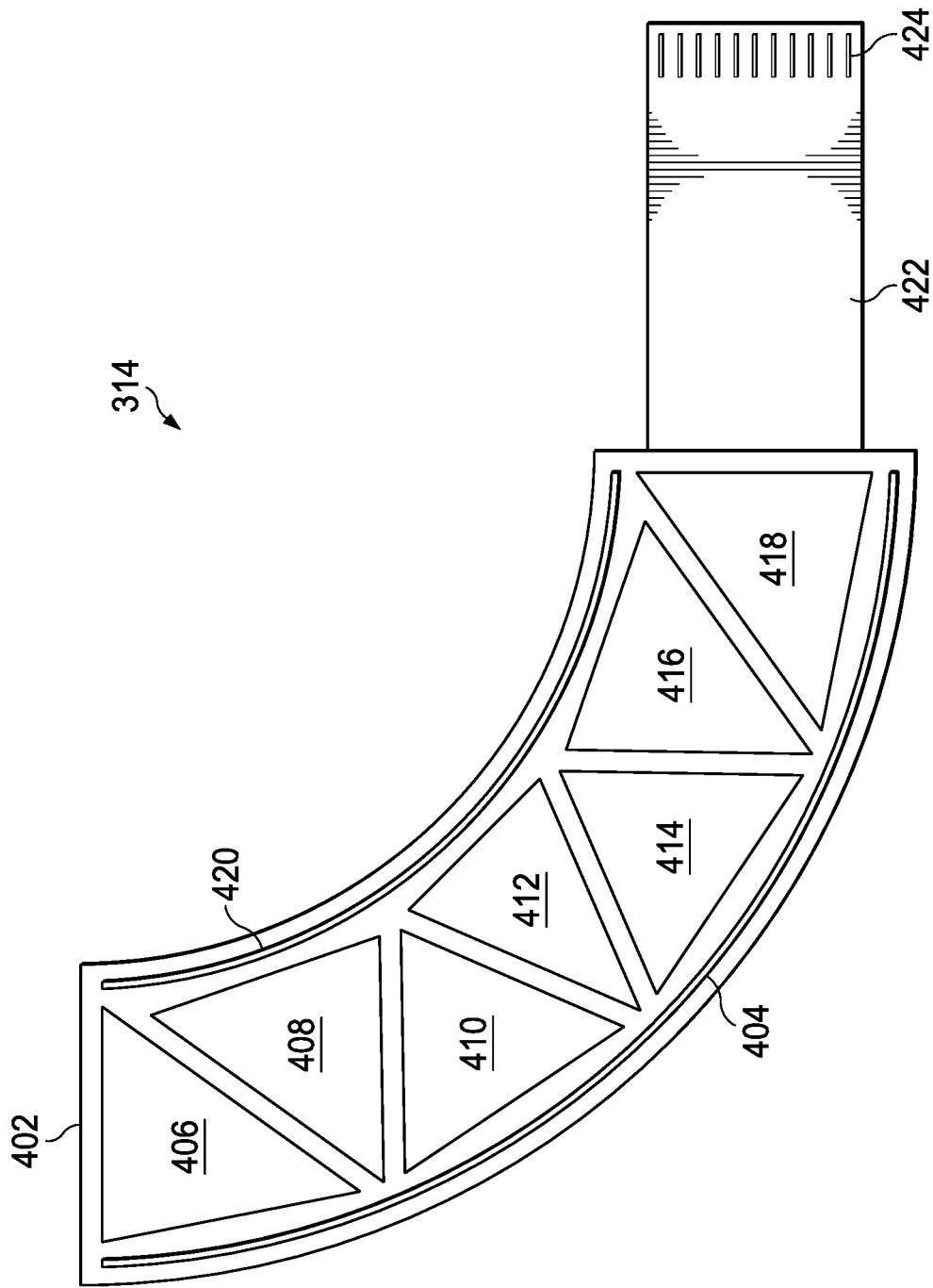
FIG. 4 is a top view of the capacitive touch sensor of FIG. 3.

Referring now to FIG. 4, the back side touch sensor 314 is illustrated in more detail. A printed circuit board 402 has a series of electrodes or traces 404, 406, 408, 410, 412, 414, 416, 418 and 420 on the surface of the printed circuit board 402. The traces 406-420 are configured in the illustrated example for a mutual-capacitive touch sensing configuration. It is understood that a self-capacitance sensing configuration could be utilized as well. A flexible cable 422 having a series of contacts 424 is connected to the printed circuit board 402 to allow electrical connection between the touch sensor controller 200 and the printed circuit board 402.

Figure 5:
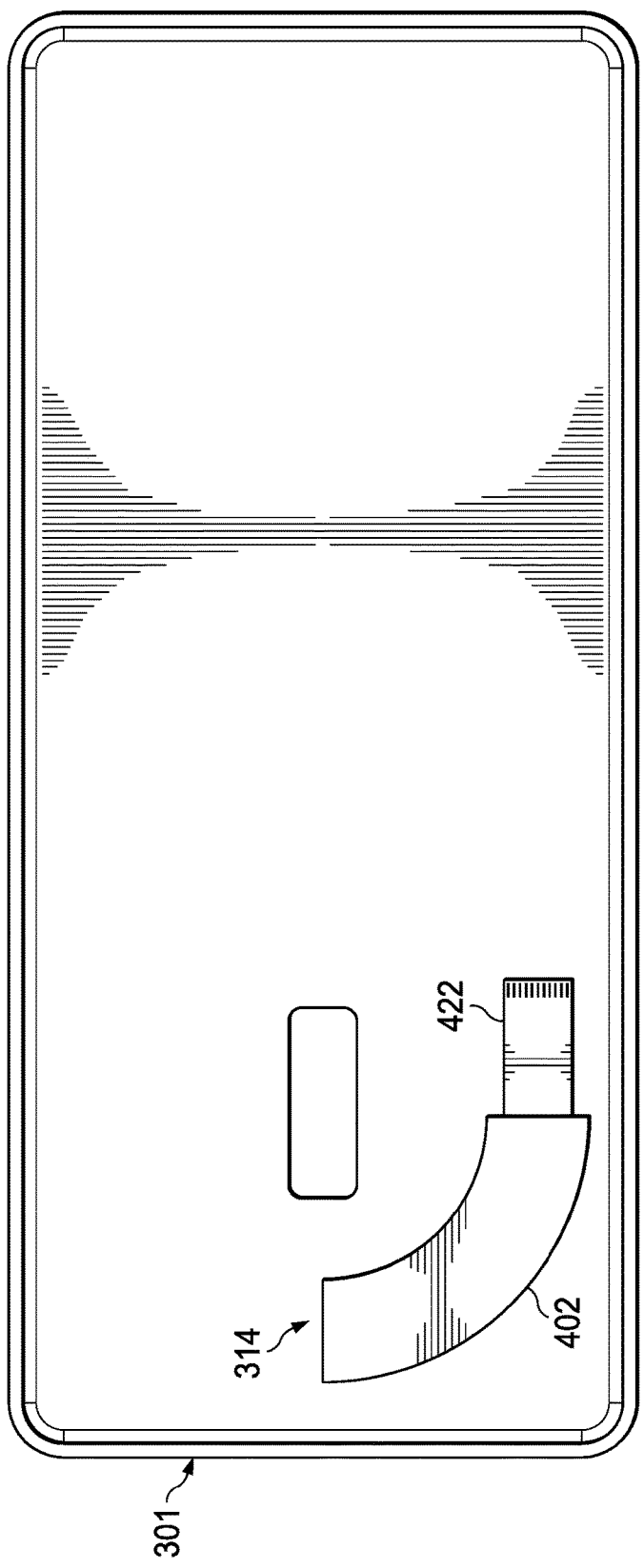
FIG. 5 is a view showing an inside view of the back cover of the mobile phone of FIG. 3.

FIG. 5 is a view of the back cover 301 of the mobile phone 300 from the inside of the mobile phone 300 so that the capacitive sensor PCB 402 and cable 422 are readily visible when mounted to the back cover 301.

Figure 6A:
FIG. 6A is a cross-sectional view of the back cover of the mobile phone of FIG. 3.
Figure 6B:
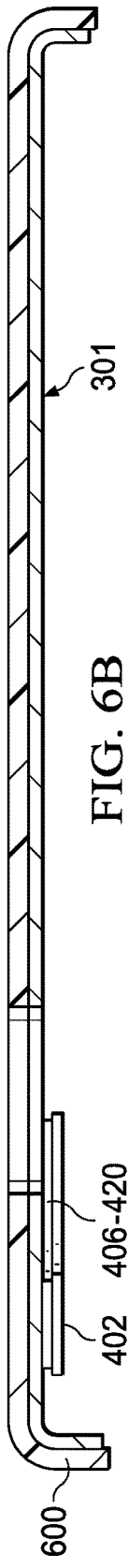
FIG. 6B is a cross-sectional view of the mobile phone of FIG. 6A with a first example case attached to the mobile phone.
Figure 6C:
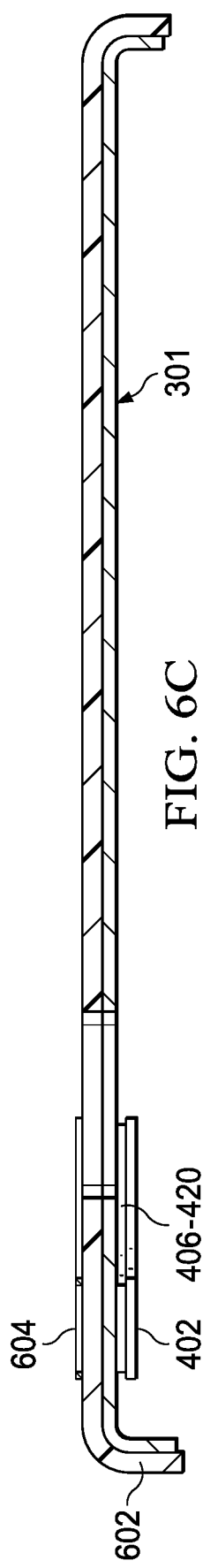
FIG. 6C is a cross-sectional view of the mobile phone of FIG. 6A with a second example case attached to the mobile phone.
Figure 6D:
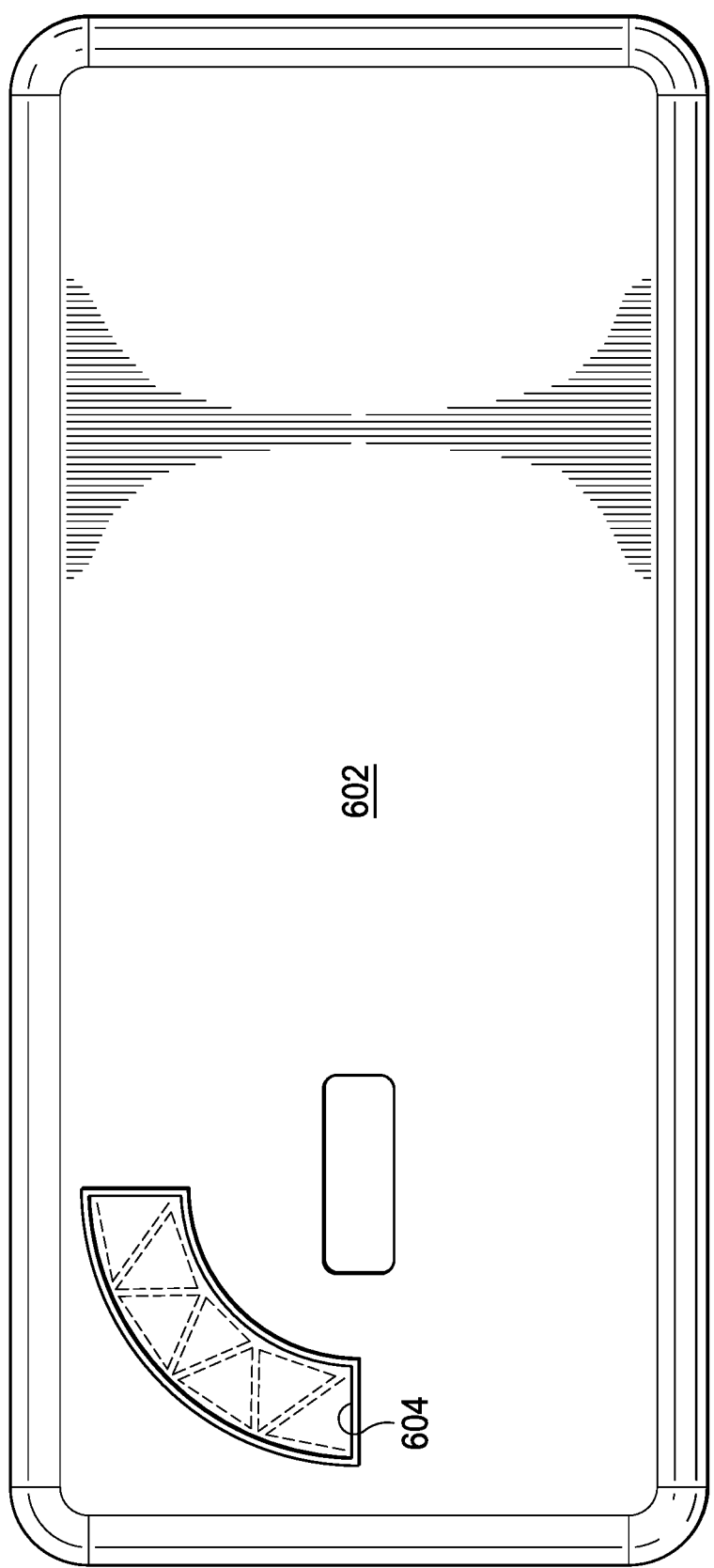
FIG. 6D is a back view of the mobile phone and second example case of FIG. 6C.
Figure 6E:
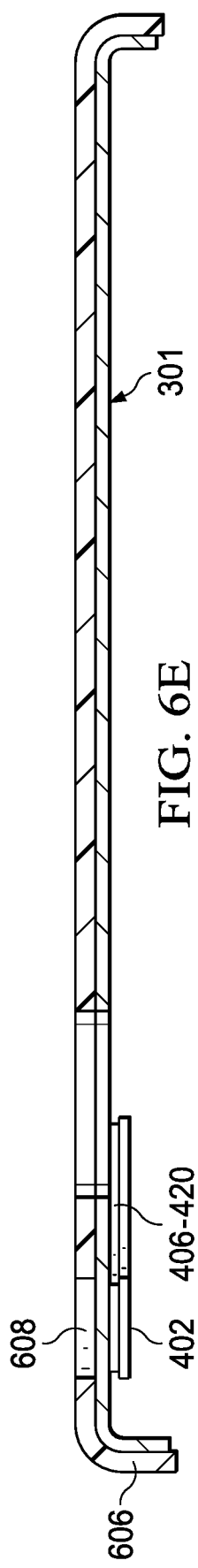
FIG. 6E is a cross-sectional view of the mobile phone of FIG. 6A with a third example case attached to the mobile phone.

Reviewing then FIG. 6A, a cross-sectional view of the back cover 301 is illustrated with the printed circuit board 402, with the various traces 406-420, illustrated as being affixed to the back cover 301. In this arrangement the traces 406-420 are very close to the outside or back of the mobile phone 300 and thus operates with a lesser level of gain because of the higher sensitivity of the configuration. In FIG. 6B, a case 600 has been added to the mobile phone 300, with the case 600 overlaying the back cover 301 to generally protect the mobile phone 300. As can be seen, this increases the distance of the user's finger from the traces 406-420. Depending on the thickness and the electrical properties of the protective material of the case 600, sensitivity of the back side touch sensor system 132 may be changed from the caseless example of FIG. 6A, such as by increasing conversion gain or count. In FIG. 6C, an alternate case 602 has been provided. The case 602 includes an external ridge or curved finger guide 604, as seen in FIG. 6D, which generally indicates or outlines the back side touch sensor 314 to allow the user to have easy index finger registration with the back side touch sensor 314. A third example case 606 is illustrated in FIG. 6E. In case 606, instead of the external ridge 604 used with the case of 602, the case 606 has an opening or cutout area 608, which generally indicates or conforms to the back side touch sensor 314. This allows both registration of the user's index finger and increased sensitivity or reduced gain, as now the cover thickness and materials are not blocking the capacitive sensors.

Figure 7:
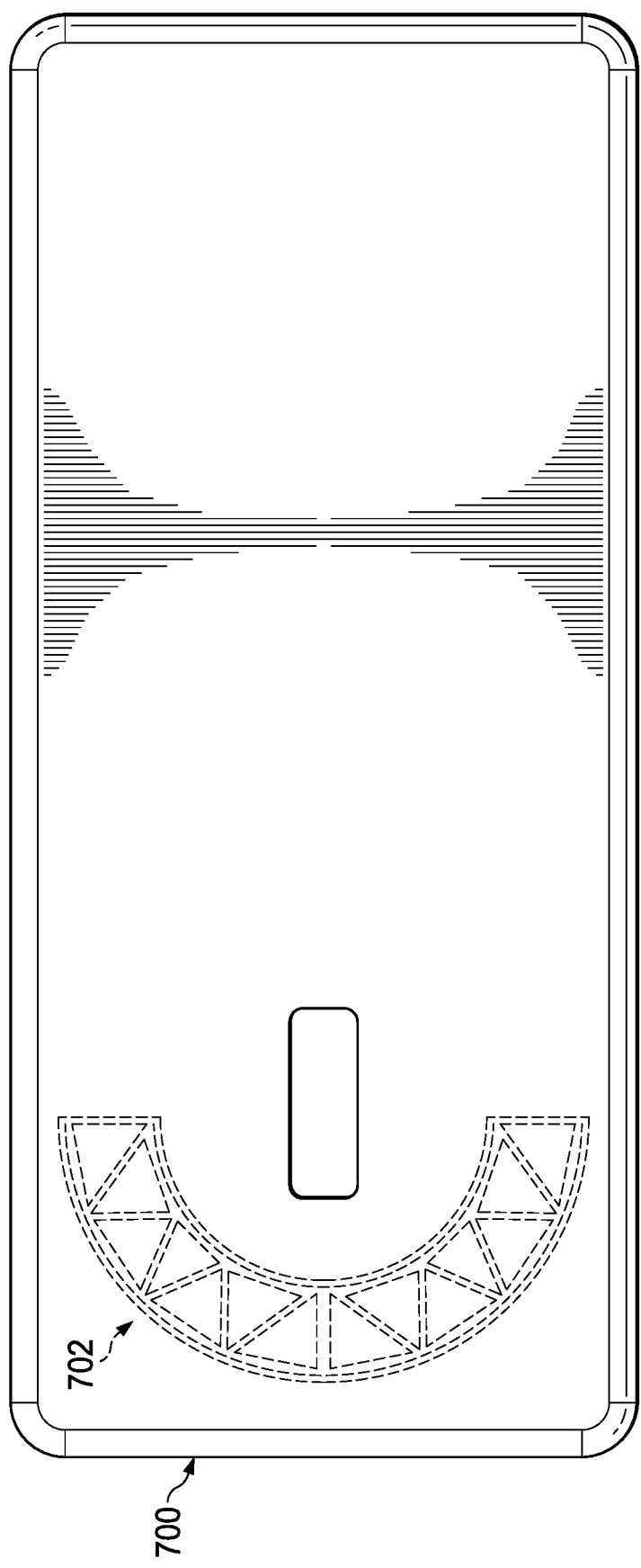
FIG. 7 is a back view of a mobile phone illustrating an example location of a second example capacitive touch sensor allowing right and left-hand operation.

FIG. 7 illustrates a mobile phone 700 having a capacitive touch sensor area 702 which is generally formed in a 180° arc, rather than the 90° arc of the back side touch sensor 314. This allows the use of the touch sensor area in either left-handed or right-handed operation, thus reducing the number of phones required to be developed, produced and inventoried.

Figure 8:
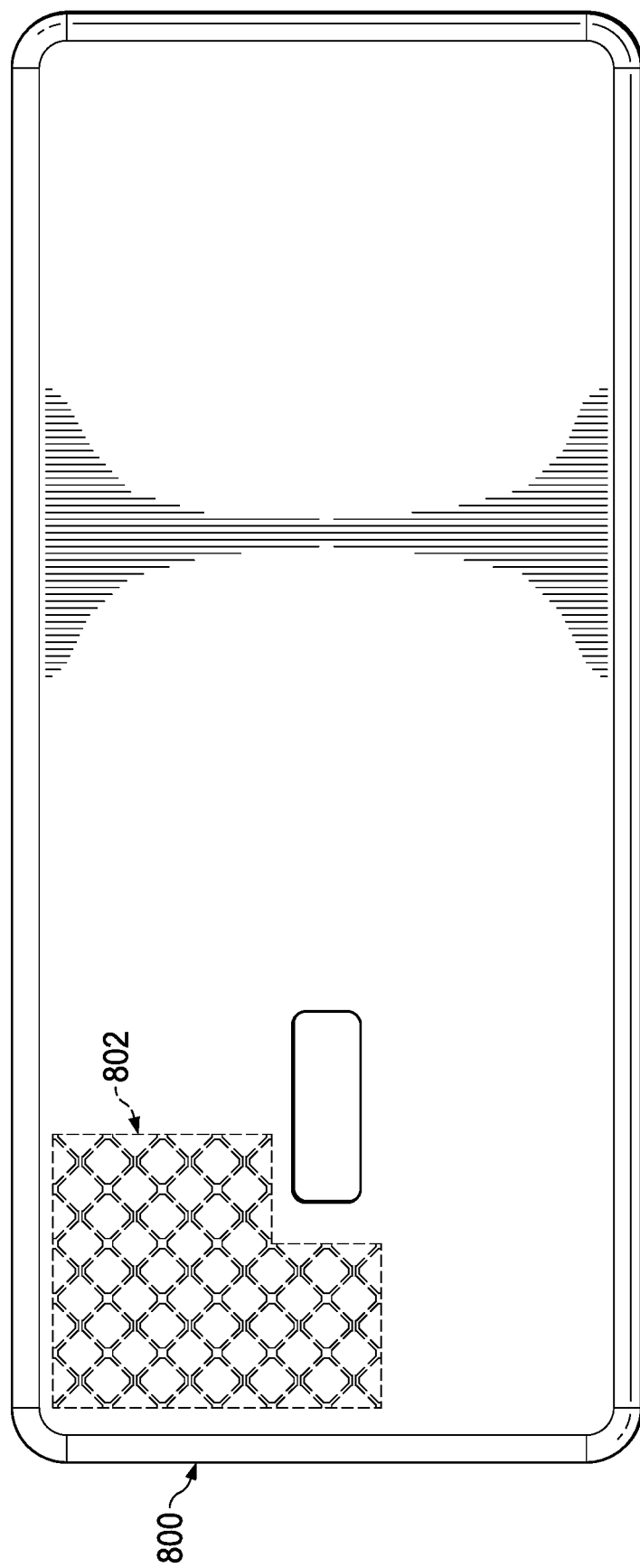
FIG. 8 is a back view of a mobile phone illustrating an example location of a third example capacitive touch sensor.
Figure 9:
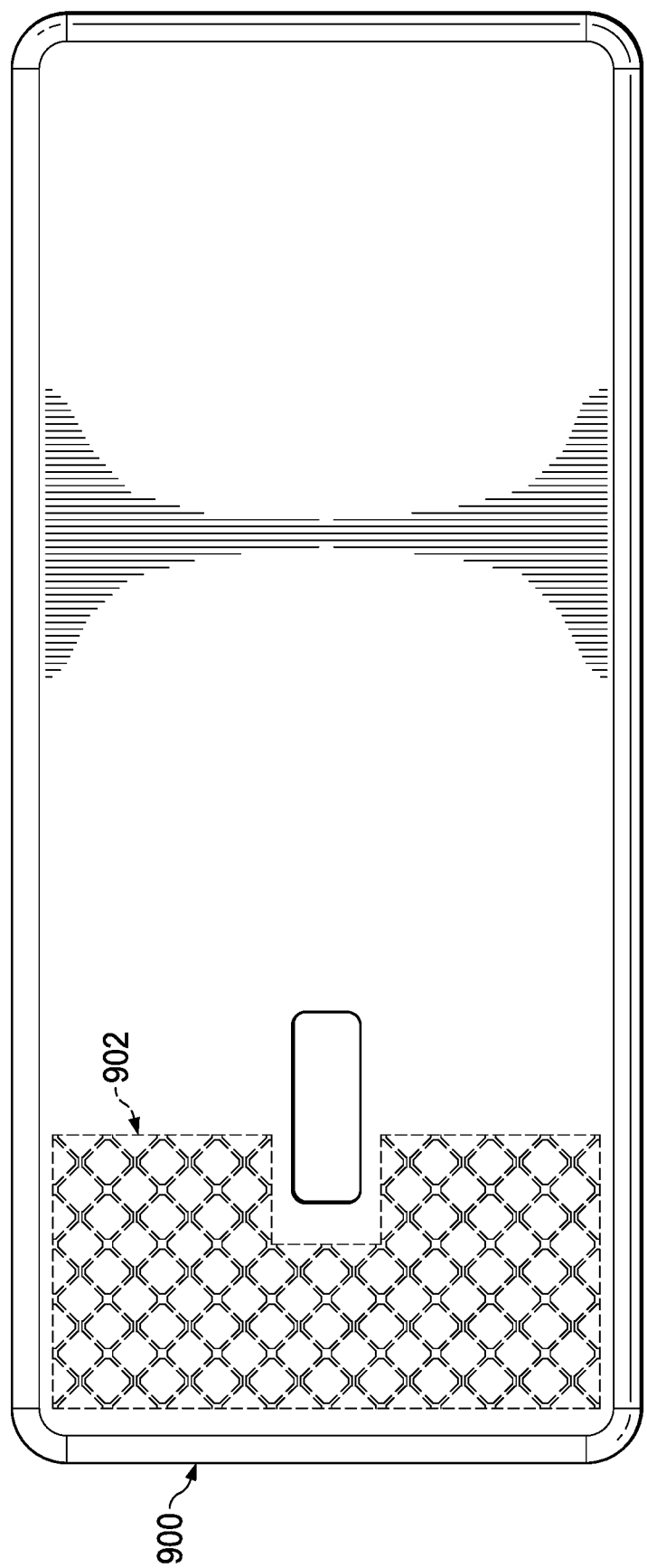
FIG. 9 is a back view of a mobile phone illustrating an example location of a fourth example capacitive touch sensor allowing right and left-hand operation.

FIG. 8 illustrates an exemplary phone 800 where the arcuate back touch sensor 314 is replaced by an areal or area sensor 802. By using an area sensor 802, two dimensional movements of the user's index finger can readily be detected, as compared to the curved one-dimensional operation of the back side touch sensor 314. This allows improved user control, though not as finely detailed as if using the front touch system. FIG. 9 illustrates a mobile phone 900 with an area sensor 902 suitable for left and right-handed operation.

Figure 10:
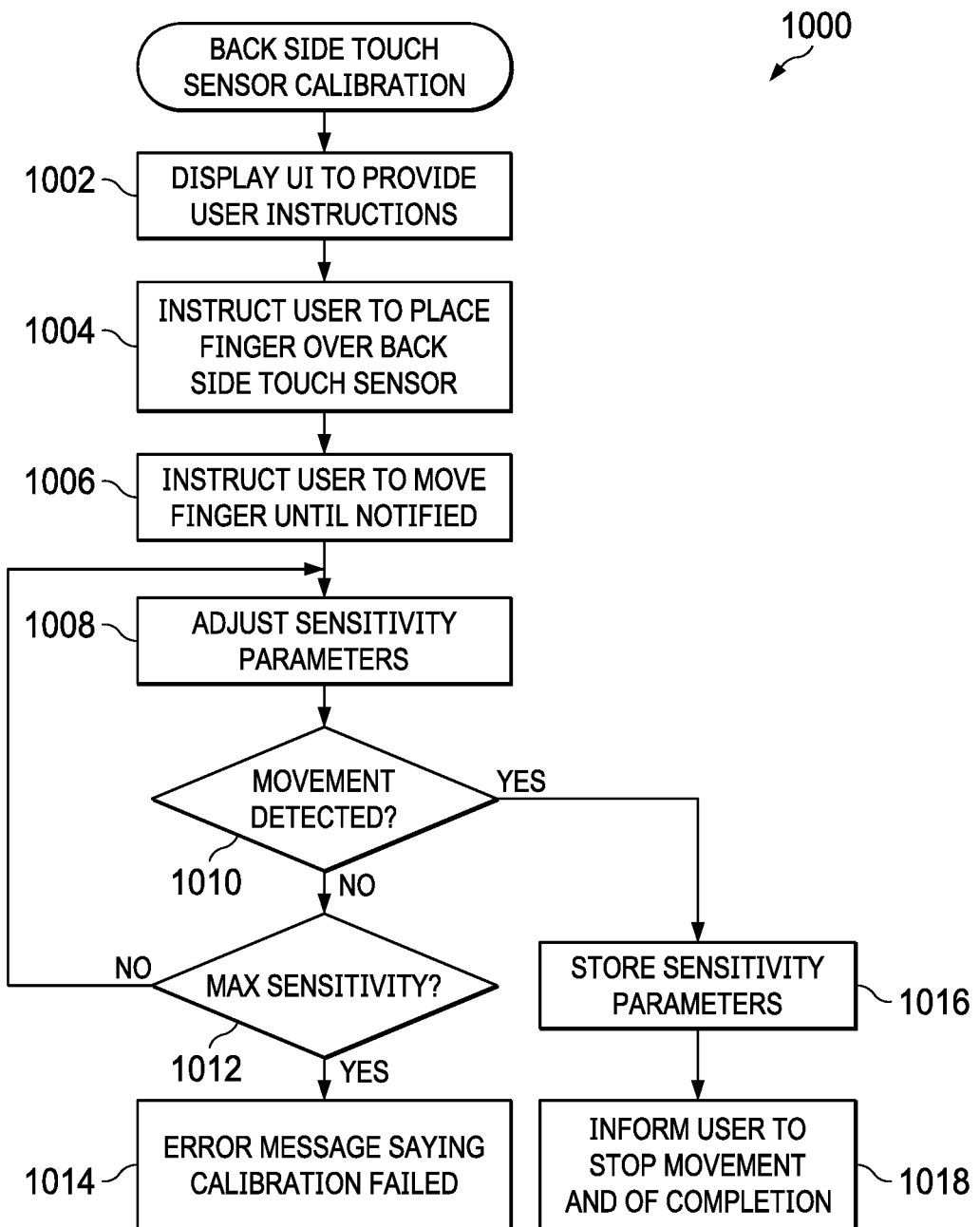
FIG. 10 is a flowchart of operations to calibrate the back side touch sensor.

FIG. 10 is a flowchart 1000 of operations to calibrate the back side touch sensor system 132. As discussed above, in some instances the mobile phone may have a case installed to protect the mobile phone. The protective material of the case and the proximity (or lack thereof) of the case back cover changes the capacitive properties of the back side touch sensor system 132 so that recalibration is necessary. In step 1002, a user interface (UI) is displayed to provide user instructions for the calibration process. In step 1004, the user is instructed to place his finger over the back side touch sensor. In step 1006, the user is instructed to begin moving his finger along the back side touch sensor. In step 1008, an initial adjustment is made of the touch sensitivity parameters. These parameters include conversion gain and conversion count. In step 1010, a determination is made whether satisfactory movement of the user's finger is detected. If not, in step 1012 a determination is made if the parameter adjustments are at maximum sensitivity. If so, in step 1014 an error message is displayed to the use to indicate that calibration has failed. If not, operation returns to step 1008 for the next adjustment of the sensitivity parameters.

If satisfactory movement was detected in step 1010, in step 1016 the sensitivity parameters are stored for continuing use. In step 1018 the user is informed that finger movement can stop and calibration is completed.

The illustrated capacitive touch sensor configurations are exemplary and variations can be used for other specific designs. For example, self-capacitance or mutual-capacitive configurations can be used. Differing configurations and number of PCB traces can be used. Alternative sensor areas and shapes can be used. For example, rather than the illustrated 90° arc, a greater or lesser arc can be used, with the arc starting or stopping at different locations.

The description has used movement of a user finger as the example touch action. It is understood that other touch actions can also be recognized, such as doubling tapping or multiple finger gestures and the like. For example, a double tap by a user finger on the back touch sensor could be used to answer a call or as an acknowledgement of a request provided on the front screen. The description has also used index finger as the example finger used to interact with the touch sensor. It is understood that other fingers or the thumb (which is considered a finger for this application) can be used as well, especially in instances where the allowed actions are just taps and not full motions.

The description is based on microcontrollers from Texas Instruments and the CapTIvate™ technology to provide a more complete description, but it is understood that other touch sensing microcontrollers and technologies can be used. In addition, it is understood that touch sensors with embedded processors can be used, with one of the processors in the handheld device providing the processing functions in replacement of the embedded processor.

While a mobile phone is used as the exemplary hand held device, it is understood that the back side touch sensor can be used on other hand held devices.

The above description is intended to be illustrative, and not restrictive. For example, the above-described examples may be used in combination with each other. Many other examples will be upon reviewing the above description. The scope should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An electronic device comprising:
  a capacitive sensor that includes:
    a printed circuit board;
    a first electrode disposed on the printed circuit board and having a curved shape;
    a second electrode disposed on the printed circuit board and having a curved shape; and
    a set of electrodes disposed on the printed circuit board between the first electrode and the second electrode.

2. The electronic device of claim 1, wherein each electrode of the set of electrodes has a substantially triangular shape.

3. The electronic device of claim 1, wherein the capacitive sensor further includes a cable that includes a set of contacts.

4. The electronic device of claim 3 further comprising:
  a sensor controller coupled to the capacitive sensor via the set of contacts of the cable.

5. The electronic device of claim 1 further comprising:
  a front side that includes a display; and
  a back side disposed opposite the front side that includes the capacitive sensor.

6. The electronic device of claim 5, wherein the back side includes a case and the capacitive sensor is disposed on the case.

7. The electronic device of claim 6, wherein the case includes a ridge extending from a remainder of the case opposite and aligned with the capacitive sensor.

8. The electronic device of claim 6, wherein the case includes a recess aligned with the capacitive sensor.

9. A mobile device comprising:
  a processor;
  a first touch sensor coupled to the processor that includes:
    a printed circuit board;
    a first electrode disposed on a radially inward portion of the printed circuit board and having a curved shape;
    a second electrode disposed on a radially outward portion of the printed circuit board and having a curved shape; and
    a set of electrodes disposed on the printed circuit board between the first electrode and the second electrode; and
  a second touch sensor coupled to the processor.

10. The mobile device of claim 9 further comprising a touchscreen that includes the second touch sensor, wherein:
  the touchscreen is disposed on a front side of the mobile device; and
  the first touch sensor is disposed on a back side of the mobile device opposite the front side.

11. The mobile device of claim 9, wherein each electrode of the set of electrodes has a substantially triangular shape.

12. The mobile device of claim 9 further comprising a case, wherein the first touch sensor is disposed on an interior surface of the case.

13. The mobile device of claim 12, wherein the case includes a ridge on an exterior surface of the case and extending from a remainder of the case opposite and aligned with the first touch sensor.

14. The mobile device of claim 12, wherein the case includes a recess aligned with the first touch sensor.

15. The mobile device of claim 9 further comprising a mobile phone system-on-a-chip that includes the processor.

16. A mobile phone device that includes:
  a mobile phone system-on-a-chip;
  a display on a front side of the mobile phone device and coupled to the mobile phone system-on-a-chip; and
  a touch sensor on a back side of the mobile phone device and coupled to the mobile phone system-on-a-chip, wherein the touch sensor includes:
    a first curved electrode;
    a second curved electrode; and
    a set of electrodes disposed between the first curved electrode and the second curved electrode.

17. The mobile phone device of claim 16, wherein the touch sensor has an arcuate shape.

18. The mobile phone device of claim 16, wherein each electrode of the set of electrodes has a substantially triangular shape.

19. The mobile phone device of claim 16, wherein the back side of the mobile phone device includes a ridge aligned with the touch sensor.

20. The mobile phone device of claim 16, wherein the back side of the mobile phone device includes a recess aligned with the touch sensor.

* * * * *